(12) United States Patent
Cudak et al.

(10) Patent No.: US 10,027,597 B2
(45) Date of Patent: Jul. 17, 2018

(54) COLLABORATIVE ROUTE RESERVATION AND RANKING IN HIGH PERFORMANCE COMPUTING FABRICS

(71) Applicant: LENOVO ENTERPRISE SOLUTIONS (SINGAPORE) PTE. LTD., New Tech Park (SG)

(72) Inventors: Gary D. Cudak, Creedmoor, NC (US); Christopher J. Hardee, Raleigh, NC (US); Jarrod B. Johnson, Raleigh, NC (US); Bryan M. Reese, Durham, NC (US)

(73) Assignee: LENOVO ENTERPRISE SOLUTIONS (SINGAPORE) PTE. LTD., Singapore (SG)

(*) Notice: Subject to any disclaimer, the term of this patent is extended or adjusted under 35 U.S.C. 154(b) by 0 days.

(21) Appl. No.: 15/700,120

(22) Filed: Sep. 9, 2017

(65) Prior Publication Data

US 2017/0373985 A1    Dec. 28, 2017

Related U.S. Application Data

(63) Continuation of application No. 14/149,202, filed on Jan. 7, 2014, now Pat. No. 9,762,505.

(51) Int. Cl.
*H04L 12/28* (2006.01)
*H04L 12/911* (2013.01)
*H04L 12/721* (2013.01)
*H04L 12/761* (2013.01)

(52) U.S. Cl.
CPC .............. *H04L 47/72* (2013.01); *H04L 45/16* (2013.01); *H04L 45/44* (2013.01); *H04L 47/826* (2013.01)

(58) Field of Classification Search
CPC .......... H04L 47/72; H04L 45/16; H04L 45/44; H04L 47/826
USPC ......................................................... 370/400
See application file for complete search history.

(56) References Cited

U.S. PATENT DOCUMENTS

| | | | |
|---|---|---|---|
| 6,693,892 B1* | 2/2004 | Rinne | H04W 72/0446 370/329 |
| 2004/0258066 A1* | 12/2004 | Chen | H04L 12/1877 370/390 |
| 2007/0066314 A1* | 3/2007 | Sherman | H04W 88/06 455/445 |

(Continued)

*Primary Examiner* — Peter Cheng
(74) *Attorney, Agent, or Firm* — Steven M. Greenberg, Esq.; CRGO Law

(57) ABSTRACT

Embodiments of the present invention provide a method, system and computer program product for collaborative route reservation in an HPC fabric. A method for collaborative route reservation in an HPC fabric includes selecting a target node in a cluster of nodes to receive a payload from a source node of the cluster over an HPC fabric and computing a route over the HPC fabric for transferring the payload from the source node to the target node, and also a duration of time requisite to transferring the payload. The method also includes notifying other nodes in the cluster of a reservation of the computed route for the duration of time and utilizing the computed route during the duration of time to transfer the payload. Finally, the method includes responding to completing transfer of the payload by notifying the other nodes that the computed path is no longer reserved.

10 Claims, 2 Drawing Sheets

(56) References Cited

U.S. PATENT DOCUMENTS

2007/0165515 A1* 7/2007 Vasseur .................. H04L 12/66
370/216
2008/0170581 A1* 7/2008 Davidson .............. H04L 49/358
370/411

* cited by examiner

COLLABORATIVE ROUTE RESERVATION AND RANKING IN HIGH PERFORMANCE COMPUTING FABRICS

CROSS-REFERENCE TO RELATED APPLICATIONS

This application is a Continuation of U.S. patent application Ser. No. 14/149,202, filed Jan. 7, 2014, the entirety of which is incorporated herein by reference.

BACKGROUND OF THE INVENTION

Field of the Invention

The present invention relates to high performance computing (HPC) and more particularly to routing communication loads in an HPC network Description of the Related Art HPC relates to the use of large numbers of processors in order to process a large computational task in a short period of time. HPC generally implies one of two different architectural approaches. One approach modeling distributed computing utilizes a large number of discrete computers distributed across a network each devoting some or all of the available processing time to solving a common problem. In this regard, each individual computer receives and completes many small tasks, reporting the results to a central server which integrates the task results from all the clients into the overall solution.

A different approach utilizes a large number of dedicated processors placed in close proximity to one other such as in a computing cluster. The placement of the processors in a cluster saves considerable time moving data around and makes it possible for the processors to work together rather than on separate tasks as in the former approach. In this regard, in the computing cluster, the different processors communicate data with one another not over mere switched network links, but over more freeform mesh or hypercube fabric communicative substrates.

The communication fabric utilized in HPC is both highly scalable and also operates at low latency with very high transfer rates. The HPC communicative fabric differs from a traditional networking topology, such as Ethernet, in that the HPC communicative fabric generally does not offer intelligence on the switch side to determine routing of data. Rather, the HPC communicative fabric provides many possible routes between different processors. As such, each node in the HPC network via a fabric or subnet manager discover and are aware of the multiple routes to each other node in the fabric.

Notwithstanding, it is possible for congestion to arise in some paths in the HPC communicative fabric while other paths are underutilized since all nodes will use the same route determination algorithm determining the shortest path to the end destination. Consequently, when the HPC fabric is not able to handle a communication load, packets are delayed and must wait for resources to be released causing a temporary but extensive performance deficiency condition in the HPC fabric. Current attempts to address the congestion that arises in the HPC fabric involve variations of adaptive routing utilizing an intelligent switch, or payload distribution utilizing multiple different paths. Even still, congestion can still occur using either scheme.

BRIEF SUMMARY OF THE INVENTION

Embodiments of the present invention address deficiencies of the art in respect to HPC fabric routing and provide a novel and non-obvious method, system and computer program product for collaborative route reservation in an HPC fabric. In an embodiment of the invention, a method for collaborative route reservation in an HPC fabric includes selecting a target node in a cluster of nodes in an HPC data processing system to receive a payload from a source node of the cluster over an HPC fabric for the HPC data processing system and computing a route over the HPC fabric for transferring the payload from the source node to the target node and also a duration of time requisite to transferring the payload from the source node to the target node. The method also includes notifying others of the nodes in the cluster of a reservation of the computed route to the exclusion of other payloads of others of the nodes for the duration of time and utilizing the computed route during the duration of time to transfer the payload from the source node to the target node. Finally, the method includes responding to completing transfer of the payload by notifying others of the nodes of the cluster that the computed path is no longer reserved.

In one aspect of the embodiment, the route is computed first by determining a selection of routes available to transfer the payload from the source node to the target node and second by selecting a route from amongst the selection of routes that has not already been reserved by another of the nodes of the cluster. In another aspect of the embodiment, the route is computed first by determining a selection of routes available to transfer the payload from the source node to the target node and second by selecting a route from amongst the selection of routes that has already been reserved by another of the nodes of the cluster, but has a shortest delay before the selected route is available to be reserved. In yet another aspect of the embodiment, the duration of time is computed according to a size of the payload, or according to a priority assigned to the payload, or according to a known historical time required to transfer the payload, or any combination thereof.

In another embodiment of the invention, an HPC data processing system can be configured for collaborative route reservation over an HPC fabric. The system can include a cluster of host computers coupled to one another over a data communications fabric. Each of the host computers can include memory and at least one processor and can act as a node of the cluster. The system also can include a route reservation module executing in memory of each of the host computers.

The module can include program code enabled upon execution in the memory of a corresponding one of the host computers, to select a target node in the cluster for receiving a payload from a source node of the cluster over the fabric, to compute a route over the fabric for transferring the payload from the source node to the target node and also a duration of time requisite to transferring the payload from the source node to the target node, to notify others of the nodes in the cluster of a reservation of the computed route to the exclusion of other payloads of others of the nodes for the duration of time, to utilize the computed route during the duration of time to transfer the payload from the source node to the target node, and to respond to completing transfer of the payload by notifying others of the nodes of the cluster that the computed path is no longer reserved.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for collaborative route reservation in an HPC fabric. In accordance with an embodiment of the invention, a target node can be selected to receive a payload from a source node over an HPC fabric for an HPC data processing system. A route can be computed for transferring the payload from the source node to the target node. As well, a duration of time requisite to transferring the payload from the source node to the target node can be computed. Thereafter, the computed route can be reserved to the exclusion of other payloads for the duration of time for use in transferring the payload from the source node to the target node. Once reserved, the computed route can be utilized during the duration of time to transfer the payload from the source node to the target node. Upon completion, others of the nodes in the HPC fabric can be notified that the computed path is no longer reserved.

Figure 1:
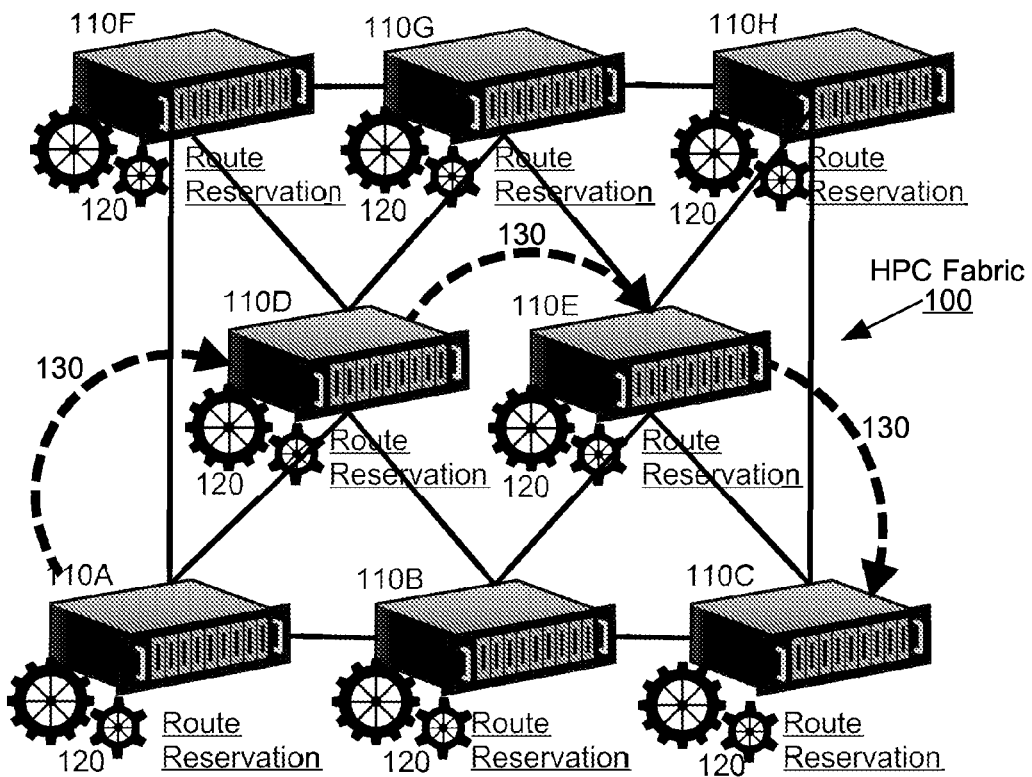
FIG. 1 is a pictorial illustration of a process for collaborative route reservation in an HPC fabric.

In further illustration, FIG. 1 pictorially shows a process for collaborative route reservation in an HPC fabric. As shown in FIG. 1, a cluster of nodes 110A-110H can be arranged in an HPC fabric 100 so as to form an HPC data processing system. Each of the nodes 110A-110H can include a computer with at least one processor and memory. Each of the nodes 110A-110H further can process data transactions therein and communicate with others of the nodes 110A-110H by transmitting data within payloads from one of the nodes 110A-110H to the other so as to contribute to high speed parallel computations. Route reservation logic 120 can be disposed within each of the nodes 110A-110H of the cluster. Specifically, route reservation logic 120 can be enabled to perform collaborative route reservation for transmitting payloads within the HPC fabric 100.

By way of example, route reservation logic 120 of source node 110A can select a target node 110C to receive a payload from the source node 110 over the HPC fabric 100. Route reservation logic 120 additionally can compute both a route 130 for transferring the payload from the source node 110A to the target node 110C, as well as a duration of time requisite to transferring the payload from the source node 110A to the target node 110C. Thereafter, route reservation logic 120 can reserve the computed route 130 to the exclusion of other payloads of others of the nodes 110B-110H for the duration of time for use in transferring the payload from the source node 110A to the target node 110C. In this regard, the route reservation logic 120 of the source node 110A can publish to the others of the nodes 110B-110H the reservation of the computed route 130. Once reserved, the computed route 130 can be utilized by the source node 110A during the duration of time to transfer the payload to the target node 110C. Upon completion, the route reservation logic 120 of the source node 110A can publish to the other nodes 110B-110H that the computed route 130 is no longer reserved.

Figure 2:
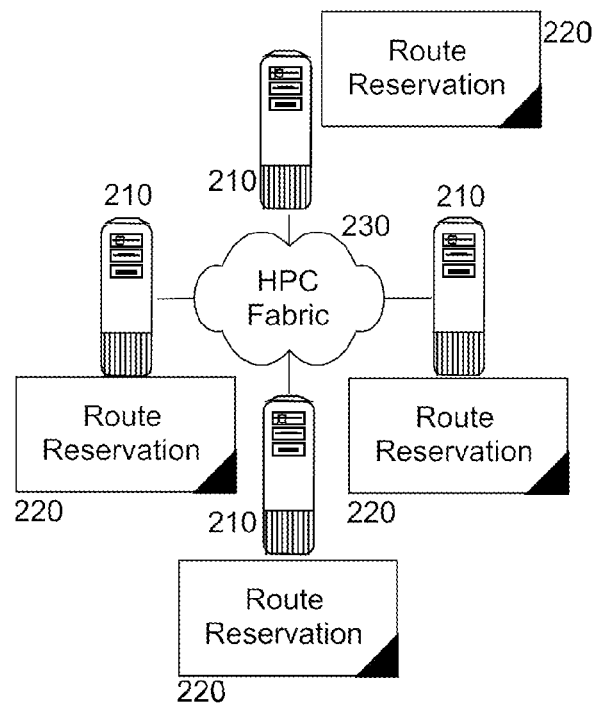
FIG. 2 is a schematic illustration of a HPC data processing system configured for collaborative route reservation in an HPC fabric; and, FIG. 3 is a flow chart illustrating a process for collaborative route reservation in an HPC fabric.

The process described in connection with FIG. 1 can be implemented within an HPC data processing system. In further illustration, FIG. 2 schematically shows an HPC data processing system configured for collaborative route reservation in an HPC fabric. The system can include a cluster of host computers 210 coupled to one another over a data communications fabric 230. Each of the host computers 210 can include memory and at least one processor and can act as a node of a cluster. The data communications fabric 230 can include a mesh network, for example, coupling each of the host computers 210 to one another without the benefit of an intelligent switch or router. The system also can include a route reservation module 220 executing in memory of each of the host computers 210.

The route reservation module 220 can include program code that when executed in the memory of one of the host computers 210 is enabled to select a target node to receive a payload from a source node over the fabric 230. The program code additionally can be enabled to compute both a route for transferring the payload from the source node to the target node, as well as a duration of time requisite to transferring the payload from the source node to the target node. The program code yet further can be enabled to reserve the computed route to the exclusion of other payloads of others of the nodes for the duration of time for use in transferring the payload from the source node to the target node. Finally, the program code can be enabled to utilize the computed route during the duration of time to transfer the payload from the source node to the target node and, upon completion, to release the exclusive use of the computer route to the other nodes.

Figure 3:
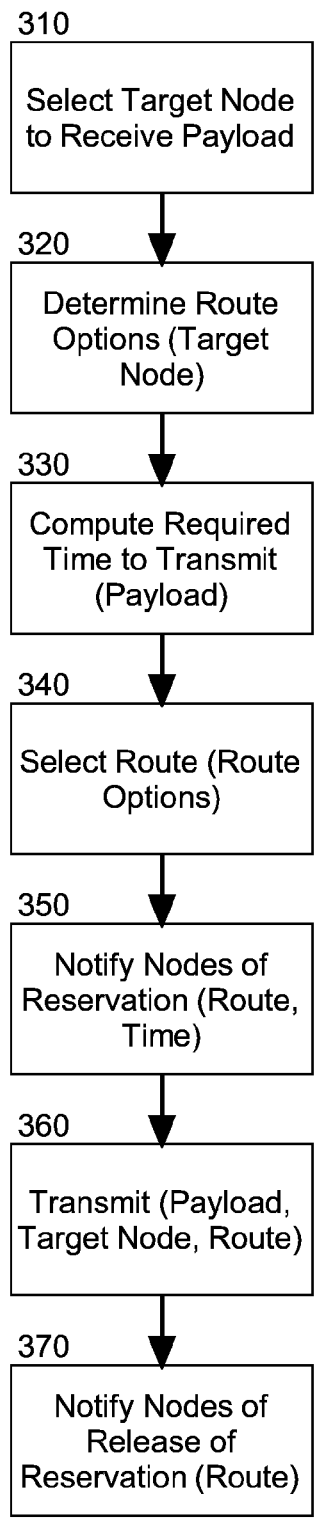

In even yet further illustration of the operation of the route reservation module 220, FIG. 3 is a flow chart illustrating a process for collaborative route reservation in an HPC fabric. Beginning in block 310, a target node in an HPC cluster can be selected to receive a payload of data transmitted from a source node of the HPC cluster over an HPC fabric. In block 320, different potential routes (data paths between the source and target nodes) can be determined for the payload and in block 330, a time required to transmit the payload across each of the different potential routes can be computed.

In this regard, the required time can be computed based upon a size of the payload, a priority assigned to the transfer of the payload from the source node to the target node, a percentage or portion of each potential route desired and can vary according to quality of service metrics including filing size, priority and time required to receive the transfer. The required time also can be computed in respect to the speed of I/O and access rates for the payload considering available memory types such as flash memory, fixed disk or dynamic RAM. The required time yet further can be computed based upon either or both of the sequence of the overall workload for which the payload is part, and a history of time consumed in transfer based upon past jobs present in the workload scheduler for the HPC cluster.

Thereafter, in block 340, one of the different potential routes can be selected, for instance based upon presently unreserved ones of the different potential routes or, a shortest delay required to reserve the desired potential route based upon a queue of payloads awaiting transfer along the desired route. In block 350, once a route has been selected, the other nodes in the fabric can be so notified of the reservation and time for which the selected route is reserved. Subsequently, in block 360 the payload can be transmitted from source node to target node over the selected route. Finally, in block 370 once the transfer of the payload is complete, the other nodes can be notified of the release of the selected route for use by the other nodes.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

1. A method for collaborative route reservation comprising:
   selecting a target node in a cluster of nodes in an high performance computing (HPC) data processing system to receive a payload from a source node of the cluster over an HPC fabric for the HPC data processing system;
   computing a route over the HPC fabric for transferring the payload from the source node to the target node and also a duration of time requisite to transferring the payload from the source node to the target node by determining a selection of routes available to transfer the payload from the source node to the target node and second by selecting a route from amongst the selection of routes that has not already been reserved by another of the nodes of the cluster;
   notifying others of the nodes in the cluster of a reservation of the computed route to the exclusion of other payloads of others of the nodes for the duration of time;
   utilizing the computed route during the duration of time to transfer the payload from the source node to the target node; and,
   responsive to completing transfer of the payload, notifying others of the nodes of the cluster that the computed path is no longer reserved;
   wherein the duration of time is computed according to a known historical time required to transfer the payload.

2. The method of claim 1, wherein the duration of time is computed according to a size of the payload.

3. The method of claim 1, wherein the duration of time is computed according to a priority assigned to the payload.

4. A high performance computing (HPC) data processing system configured for collaborative route reservation, the system comprising:
   a cluster of host computers coupled to one another over a data communications fabric, each of the host computers including memory and at least one processor and acting as a node of the cluster; and,
   a route reservation module comprising program code executing in the memory of a corresponding one of the host computers, to select a target node in the cluster for receiving a payload from a source node of the cluster over the fabric, to compute a route over the fabric for transferring the payload from the source node to the target node and also a duration of time requisite to transferring the payload from the source node to the target node by determining a selection of routes available to transfer the payload from the source node to the target node and second by selecting a route from amongst the selection of routes that has not already been reserved by another of the nodes of the cluster, to notify others of the nodes in the cluster of a reservation of the computed route to the exclusion of other payloads of others of the nodes for the duration of time, to utilize the computed route during the duration of time to transfer the payload from the source node to the target node, and to respond to completing transfer of the payload by notifying others of the nodes of the cluster that the computed path is no longer reserved;
   wherein the duration of time is computed according to a known historical time required to transfer the payload.

5. The system of claim 4, wherein the fabric is a mesh network coupling each of the host computers to one another without the benefit of an intelligent switch or router.

6. The system of claim 4, wherein the duration of time is computed according to a size of the payload.

7. The system of claim 4, wherein the duration of time is computed according to a priority assigned to the payload.

8. A computer program product for collaborative route reservation comprising:
   a non-transitory computer readable storage medium having computer readable program code embodied therewith, the computer readable program code comprising:
   computer readable program code for selecting a target node in a cluster of nodes in an high performance computing (HPC) data processing system to receive a payload from a source node of the cluster over an HPC fabric for the HPC data processing system;
   computer readable program code for computing a route over the HPC fabric for transferring the payload from the source node to the target node and also a duration of time requisite to transferring the payload from the source node to the target node by determining a selection of routes available to transfer the payload from the source node to the target node and second by selecting a route from amongst the selection of routes that has not already been reserved by another of the nodes of the cluster;
   computer readable program code for notifying others of the nodes in the cluster of a reservation of the computed route to the exclusion of other payloads of others of the nodes for the duration of time;
   computer readable program code for utilizing the computed route during the duration of time to transfer the payload from the source node to the target node; and,
   computer readable program code for responding to completing transfer of the payload by notifying others of the nodes of the cluster that the computed path is no longer reserved;
   wherein the duration of time is computed according to a known historical time required to transfer the payload.

9. The computer program product of claim 8, wherein the duration of time is computed according to a size of the payload.

10. The computer program product of claim 8, wherein the duration of time is computed according to a priority assigned to the payload.

* * * * *